UNITED STATES PATENT OFFICE.

LEBBEUS W. LATHROP AND THEODORE A. WEBER, OF NEW YORK, N. Y.

IMPROVEMENT IN COMPOSITIONS FOR JOURNAL-BEARINGS.

Specification forming part of Letters Patent No. 165,937, dated July 27, 1875; application filed June 26, 1875.

*To all whom it may concern:*

Be it known that we, LEBBEUS W. LATHROP and THEODORE A. WEBER, both of the city, county, and State of New York, have invented certain new and useful Improvements in a Composition of Matter for Lining Journal-Boxes or Making Machinery-Bearings; and that the following is a full, clear, and exact description of the same.

Our invention consists in a composition of matter made of the hereinafter-mentioned ingredients, and in about the proportions named, and used as a lining for journal-boxes, or for mechanical bearings of any kind, as follows: of gum-copal, twenty-five (25) parts; of sulphur, thirty-five (35) parts; of graphite, forty (40) parts.

These ingredients are thoroughly mixed in a dry condition, and the mixture is then placed in a mold which has been previously heated to a high temperature—say, from 250° to 300° Fahrenheit—said mold being capable of great compression by means of a screw or other well-known power, and in such a mold, in the presence of steam, the composition is pressed into proper shape, whether as a lining for journal-boxes or for machinery-bearings.

The dry heat of the mold, without the presence of steam, would put the composition into a molten or plastic condition, in which condition it could not be easily, if at all, pressed into proper shape. The presence of the steam in the molds keeps the composition in proper condition for molding and becoming compact, while its absence would so soften it, as stated, in the hot molds as to prevent the rigid compression which it is subjected to.

These linings of machinery-bearings make a solid, anti-frictional, dry lubricating-surface, not affected by the absorption of moisture, and capable of sustaining very great weight without fracture, and of great endurance under the highest velocities.

The bearings may be made in any of the usual forms given to journal, shaft, or spindle bearings, the counterpart of such bearings being formed in the molds.

Having thus fully described our invention, what we claim is—

The compound or composition consisting of copal, sulphur, and graphite, in the proportions substantially as stated, for making journal-box linings or machinery-bearings, substantially as described.

LEBBEUS WISNER LATHROP.
THEODORE A. WEBER.

Witnesses:
W. E. CARPENTER,
SAMUEL SULLIVAN.